No. 669,224. Patented Mar. 5, 1901.
C. J. SHIRREFF.
CARPET SWEEPER.
(Application filed Nov. 18, 1899.)

(No Model.) 2 Sheets—Sheet 1.

Witnesses:
John Grist
H. H. Horsey.

Inventor:
C. J. Shirreff
By Henry Grist
Attorney.

THE NORRIS PETERS CO., PHOTO-LITHO., WASHINGTON, D. C.

UNITED STATES PATENT OFFICE.

CHARLES JAMES SHIRREFF, OF BROCKVILLE, CANADA.

CARPET-SWEEPER.

SPECIFICATION forming part of Letters Patent No. 669,224, dated March 5, 1901.

Application filed November 18, 1899. Serial No. 737,400. (No model.)

*To all whom it may concern:*

Be it known that I, CHARLES JAMES SHIRREFF, a subject of the Queen of Great Britain, residing at the town of Brockville, in the county of Leeds, in the Province of Ontario, in the Dominion of Canada, have invented certain new and useful Improvements in Carpet-Sweepers; and I do hereby declare the following to be a full, clear, and exact description of the invention, such as will enable others skilled in the art to which it appertains to make and use the same.

My invention relates to improvements in rotary-brush carpet-sweepers, and has for its object to cant or tip two pans whereby they will dump the sweepings toward one another and under the rotary brush, so that the sweepings may be discharged into an ordinary-sized house-pail without spilling a portion outside the pail.

Figure 1:
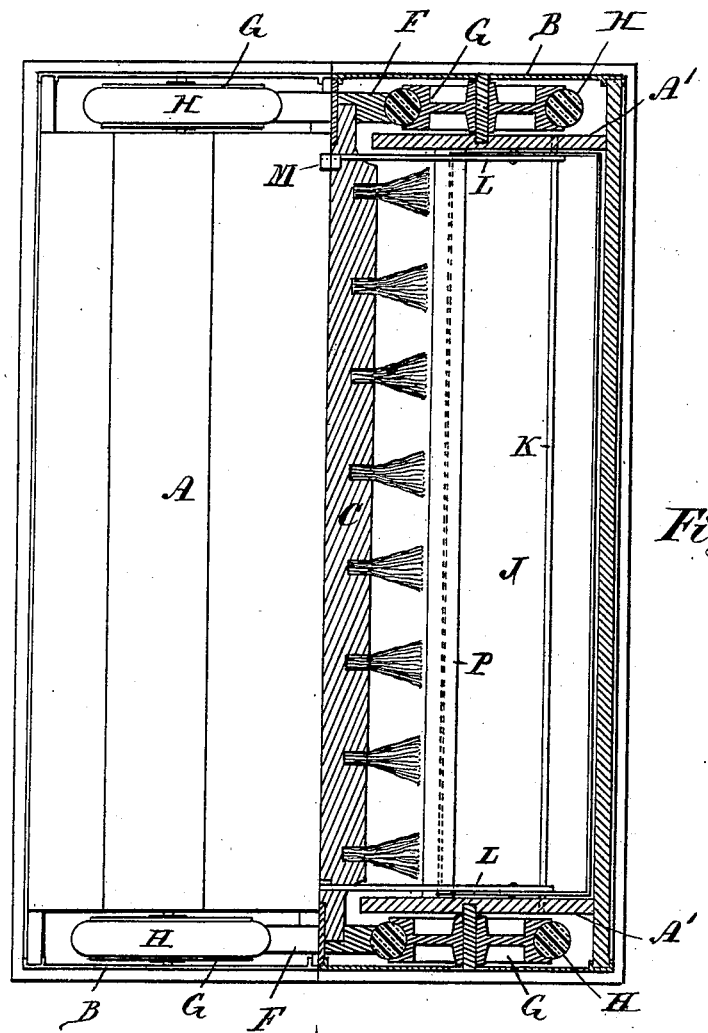
Figure 2:
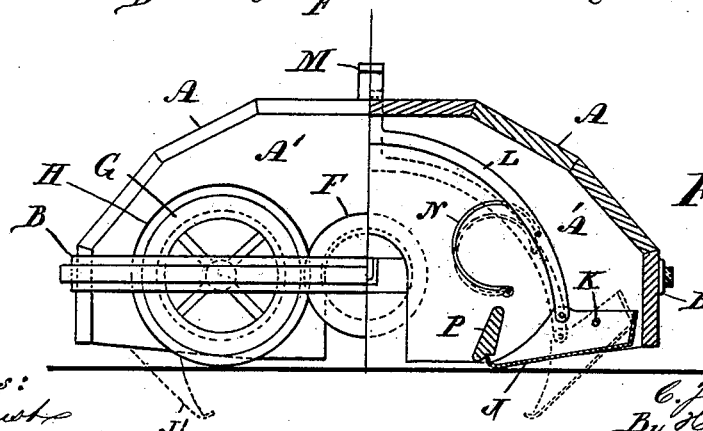
Figure 3:
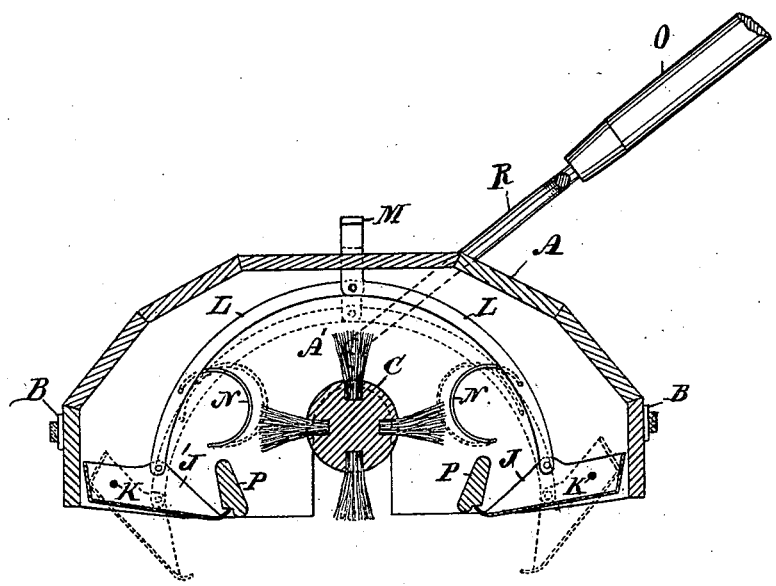

Figure 1 is a top view of my improved carpet-sweeper, one-half in section; Fig. 2, an end elevation of the sweeper, one-half in section; and Fig. 3 is a transverse vertical section.

A is a polygonal top or casing of the sweeper, the ends closed by pieces A'. B represents horizontal bars offset from said ends to carry the journals of the brush-shaft C, and on said shaft, near the ends, is keyed friction-wheels F. G represents ground-wheels having rubber tires H, which have frictional contact with said wheels F to rotate the brush-shaft.

J J' are dust-pans hung pivotally on a rod K, the ends secured to the ends of the casing, and said pans are connected pivotally to the bifurcated ends of a lever L, so that when the lever is depressed by hand or foot power or pressure on the push-piece M the pans will tip facing one another, as shown in dotted lines, and discharge the sweepings in a single line, or nearly so, to be compactly dumped. The bifurcated lever L is reacted by springs N to return the pans to their normal position against a bar P, which is chamfered along the edge to receive the edge of the pans, whereby the edges of the pans will be protected by the chamfer from injury while sweeping and retain the sweepings in the pans until the pans are dumped. The bars P are fixed and secured to the ends A' of the casing.

The sweeper is provided with a handle O and a bail R, which at the ends is connected to the ends of the casing in the usual manner.

I claim as my invention—

In a carpet-sweeper, a casing having two dust-pans hung pivotally in the brush-chamber to face each other, a bifurcated foot-lever connected to said pans to dump them simultaneously, and springs reacting said lever to return the pans to their normal position, whereby both pans discharge toward one another, as set forth.

In testimony whereof I have signed my name to this specification in the presence of two subscribing witnesses.

CHARLES JAMES SHIRREFF.

Witnesses:
HENRY F. H. MARSDEN,
W. H. CHAPMAN.